Patented Mar. 12, 1946

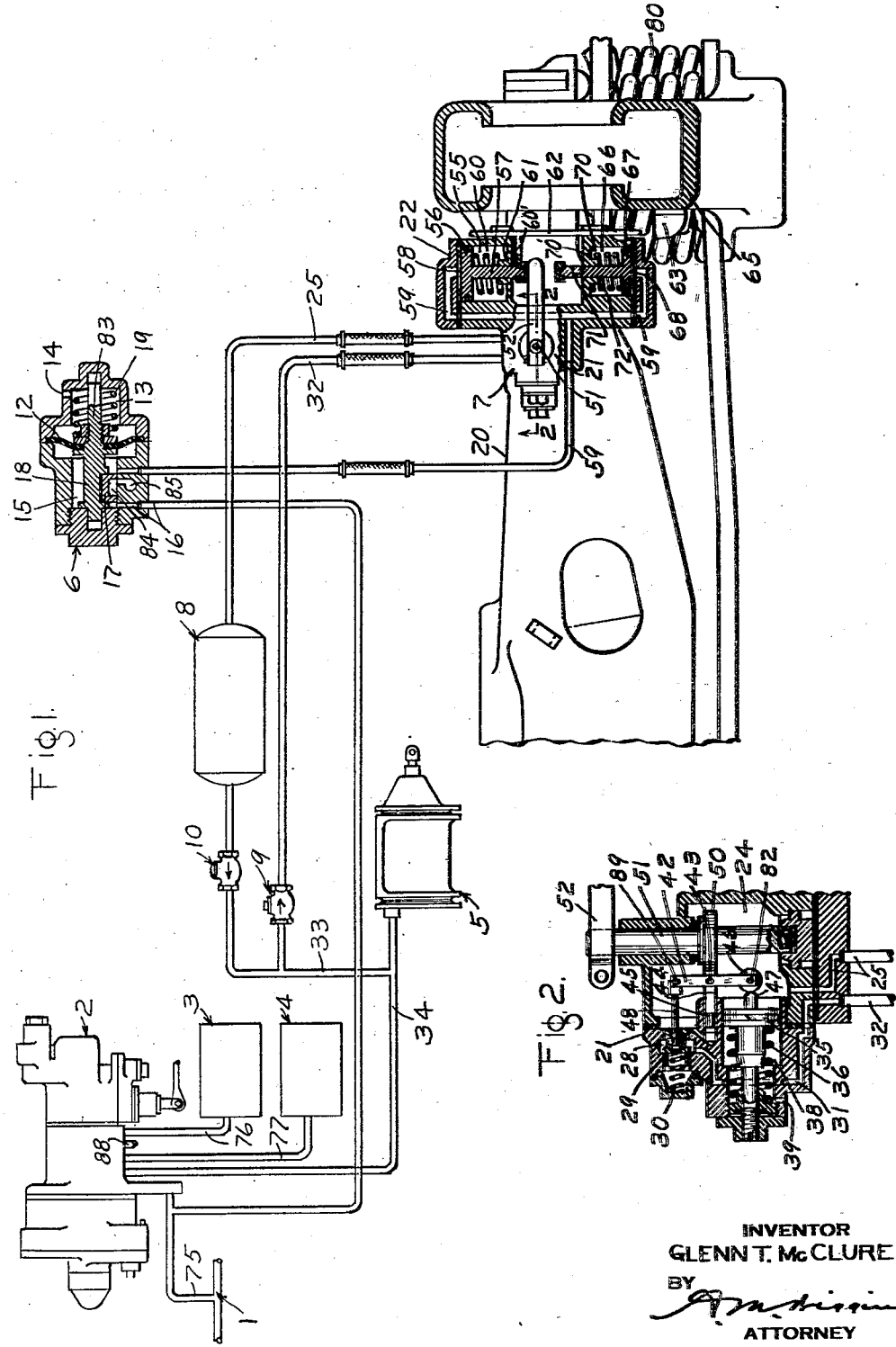

2,396,431

UNITED STATES PATENT OFFICE 2,396,431

VARIABLE LOAD BRAKE

Glenn T. McClure, McKeesport, Pa., assignor to The Westinghouse Air Brake Company, Wilmerding, Pa., a corporation of Pennsylvania Application February 27, 1943, Serial No. 477,385

10 Claims. (Cl. 303—22)

This invention relates to variable load fluid pressure brakes, in which the braking power is automatically varied according to variations in the weight of the lading on the vehicle.

The principal object of the invention is to provide an improved variable load brake apparatus of the above mentioned type.

Another object of the invention is to provide a novel variable load brake apparatus which is so constructed and arranged that, when the brake pipe pressure is being increased in charging, it will be automatically conditioned or changed over from empty braking to any degree of load braking, called for by the weight of the load carried by the body of the vehicle, and which, when the brake pipe pressure exceeds a predetermined limit, will be maintained in its conditioned state so long as the brake pipe pressure is not reduced below said predetermined limit.

Still another object of the invention is to provide a novel vehicle variable load brake mechanism which may be used in conjunction with a standard air brake equipment for the purpose of controlling the brake cylinder pressure in accordance with the brake pipe reduction and with various weights of loads carried by the vehicle.

Other objects and advantages will appear in the following detailed description of the invention.

In the accompanying drawing

Fig. 1 is a diagrammatic view, partly in section, of a variable load brake apparatus constructed in accordance with the invention.

Fig. 2 is a sectional view, on an enlarged scale, of that portion of the variable load valve mechanism associated with a truck of the vehicle and shown in outline in Fig. 1, the view being taken on the line 2—2 of Fig. 1.

DESCRIPTION

As shown in Fig. 1, the variable load fluid pressure brake equipment may comprise a brake pipe 1, a brake controlling valve device 2, an auxiliary reservoir 3, an emergency reservoir 4, a brake cylinder device 5, a change-over control valve device 6, a variable load valve mechanism 7, a volume reservoir 8, and two non-return check valve devices, 9 and 10.

The brake controlling valve device 2 shown is of the "AB" type but may be of any other desired type. This controlling valve device may be of substantially the same construction and have substantially the same operating characteristics as the "AB" valve device fully described in the patent to Clyde C. Farmer, No. 2,031,213, issued February 18, 1936, and in view of this it is deemed unnecessary to show and describe the device in detail. It will, of course, be understood that this mechanism operates upon a service reduction in brake pipe pressure to supply fluid under pressure from the auxiliary reservoir 3 to the brake cylinder 5 to effect a service application of the brake, upon an emergency reduction in brake pipe pressure, to supply fluid under pressure from both the auxiliary and emergency reservoirs 3 and 4, respectively, to the brake cylinder 5 to effect an emergency application of the brakes and upon an increase in brake pipe pressure to effect a release of brakes and the charging of the brake equipment.

The change-over control valve device 6, which may be mounted on the car body, may comprise a two piece casing having clamped therebetween a flexible diaphragm 12. At one side of this diaphragm there is a chamber 13 which is constantly connected through a passage 14 with the atmosphere. At the opposite side of the diaphragm there is a valve chamber 15 which is constantly connected through a passage and pipe 16 and pipe 75 to the brake pipe 1.

Contained in valve chamber 15 is a slide valve 17 which is adapted to be operated by a stem 18 operatively connected to the diaphragm 12 in any suitable manner. Contained in chamber 13 is a spring 19 which, at all time, tends to urge the diaphragm 12, stem 18 and slide valve 17 toward the position in which they are shown in the drawing.

The variable load valve mechanism 7 comprises a casing structure which is rigidly secured in any suitable manner to a sprung part of the vehicle, such, for instance, as the truck bolster 20 of a truck of the vehicle. As illustrated, the casing structure comprises a brake cylinder pressure control valve portion 21 and a weighing portion 22 operative, in accordance with the load carried by the vehicle, to control the brake cylinder pressure control valve portion 21.

As best shown in Fig. 2, the casing portion of the brake cylinder pressure control valve portion 21 has formed therein a pressure chamber 24 which is connected to the volume reservoir 8 by way of a passage and pipe 25. A valve chamber 28 is formed in the casing and has mounted therein a valve 29, which is biased in the direction of its seated position by the pressure of a coil spring 30, and is adapted to control communication between the pressure chamber 24 and a fluid pressure passage 31 formed in the casing. The brake cylinder pipe 34, which leads from the brake controlling valve device 2 to the brake cylinder 5, is connected through a pipe 33, the check valve device 9 and pipe 32 with the passage 31. The check valve device 9 is interposed in the pipe 32 and is operative to prevent back flow of fluid under pressure from the pipe 32 and thereby from the pressure chamber 24 to the pipe 32 and brake cylinder 5. The check valve of the device 9 is biased in the direction of its closed position by a spring so as to insure that a predetermined pressure will be established in the brake cylinder before it will operate to permit flow from the brake cylinder to the pressure chamber 24.

Mounted in a suitable bore formed in the casing and in parallel relation with the valve 29 is a piston 35, which is subject on one side to the pressure of fluid in the chamber 24 and on the other side to the opposing pressure of a coil spring 36 that is disposed in a chamber 38 which communicates by way of a passage 39 with the atmosphere.

The valve 29 and the piston 35 are both adapted to be controlled by operation of a lever 42 which is pivotally mounted intermediate its ends on a pin 43 carried by a plunger 44 which is slidably mounted at one end in a suitable guide bore 45 formed in the casing. One end of the lever 42 is provided with a roller 46 which is engageable with the outer end of a projection 47 formed on the outer face of piston 35, while the other end of the lever 42 is pivotally connected to a rod 48 which is operatively aligned with the supply valve 29. The other end of the plunger 44 engages a cam 50 rigidly secured to an operating shaft 51. The shaft 51 is rotatable in bearings formed in the casing, and has secured to one end, which extends to the exterior of the casing, an operating lever 52 operative to rotate the shaft as hereinafter described.

The casing of the weighing portion has formed therein a bore 55 in which there is mounted a piston 56 having a stem 57. At one side of piston 56 there is a chamber 58 which is connected to a passage and pipe 59 leading to the change-over control valve device 6. At the opposite side of the piston 56 is a chamber 60. The piston stem 57 passes through chamber 60 and extends through laterally extending wall 60' of chamber 60 to the interior of chamber 60 and at its end is adapted to engage one side of the operating lever 52 hereinbefore mentioned. Also contained in chamber 60 and surrounding the stem 57 is a spring 61 which is interposed between and operatively engages the piston 56 and the wall 60' of chamber 60.

Slidably mounted in the weighing portion of the casing is a rod 62 which is rigidly secured in any suitable manner to that portion of the stem 57 which extends below the wall 60'. The rod 62 is so constructed and arranged as to permit the lower end thereof to engage a stop member 63 carried by an unsprung part of the truck, such, for instance, as a truck side frame 65, for a purpose hereinafter described.

Mounted in a suitable bore 66 formed in the casing of the weighing portion and in vertical aligned relationship with the piston 56 is a piston 67, which latter piston is smaller in diameter than the piston 56. At one side of piston 67 there is a chamber 68 which is also connected to the passage 59 leading to the change-over control valve device 6. At the opposite side of the piston 67 there is a chamber 70.

The piston 67 is provided with a stem 71 which passes through chamber 70 and extends through a wall 70' of the casing to the exterior of chamber 70 and at its end is adapted to engage the opposite side of the operating lever 52. Contained in chamber 70 and surrounding the piston stem 71 is a spring 72 which is interposed between and operatively engages the piston 69 and the wall 70'.

It will be understood by those skilled in the art that when the vehicle is empty, the truck bolster 20 will be in its normal or uppermost position, as shown, and that as the load carried by the truck increases, the usual truck springs 80 will be compressed so that the truck bolster will move downwardly relative to the truck side frame 65 and that this relative movement will always be proportional to the weight imposed on the truck bolster 20. As this movement occurs on trucks equipped with the present embodiment of the invention, the clearance or distance between the lower end of rod 62, carried by the piston stem 57, and the stop 63 is reduced.

OPERATION

Initial charging of the equipment

Assuming the vehicle, embodying the invention to be empty and separated from a train, the brakes on the vehicle to be released, the brake pipe 1 of the vehicle to be deplete of fluid under pressure, and the operating lever 52, of the brake cylinder pressure control portion 21 of the variable load valve mechanism 7, to be temporarily disposed in the position in which it is shown, i. e. full load braking position. Under these conditions, the brake controlling valve device 2 will be in release position and the several other parts of the equipment will all be in the position illustrated in the drawing.

With the operating lever 52 in full load braking position as shown in Fig. 1, the operating cam 50 is also in full load braking position as shown in Fig. 2. With the cam 50 in this position, the outer end of the plunger 44 may be either in contact with the cam surface, as shown or in close proximity to said surface. It will be noted that the cam in its full load braking position may not exert any inward pressure on the plunger 44 so that the pressure of the spring 30 maintains the valve 29 seated.

Now if the empty vehicle is placed in a train, the brake pipe 1 will of course be connected at each end of the vehicle to the corresponding brake pipe at the adjacent end of each adjacent vehicle in the train and as a result will be charged with fluid under pressure in the usual manner. Fluid under pressure thus supplied to the brake pipe 1 flows through a branch pipe 75 to the several chambers of the brake controlling valve device 2 which are to be charged, and from the brake controlling valve device, the fluid flows in the usual manner, to the auxiliary reservoir 3 and the emergency reservoir 4 by way of pipes 76 and 77, respectively, in the usual manner.

Fluid under pressure flows from the branch pipe 75 to the slide valve chamber 15 in the change-over control valve device 6 by way of connected pipe and passage 16, the spring 19 maintaining the diaphragm 12 and attached slide valve 17 in the position shown until, as presently described, a predetermined pressure has been built up in the valve chamber 15.

Fluid under pressure supplied to chamber 15 of the change-over control valve device 6 flows to chambers 58 and 68 in the weighing portion 22 of the variable load valve mechanism 7 by way of pipe and passage 59. Fluid under pressure thus supplied to chamber 58 causes the piston 56, stem 57 and attached rod 62 to move downwardly from the position viewed in Fig. 1 of the drawing. Since, as shown, the outer end of the piston stem 57 engages the upper side to the operating lever 52, any downward movement of the stem 57 will effect clockwise rotation of the lever 52. Fluid under pressure supplied to chamber 68 causes the piston 67 and attached stem 71 to move upwardly in opposition to spring 72 until the outer or upper end of stem 71 engages the lower surface of the operating lever 52.

Since the area of piston 56 is larger than that of piston 67, the piston 56 and attached stem 57 will be caused to move downwardly under the influence of an increase in pressure in chamber 58 against the opposing pressure of spring 61, and the pressure of fluid in chamber 68 acting through the medium of piston 67, stem 71 and operating lever 52. As the piston 56 and attached stem 57 continue to move in this direction the operating rod 52 and the operatively connected shaft 51 are caused to rotate in a clockwise direction from the position in which they are shown in Fig. 1 of the drawing. The piston 56, stem 57 and attached rod 62 continue to move downwardly, causing continued rotation of the operating lever 52 and shaft 51 until the piston 56 and attached stem 57 are brought to a stop by the end of the rod 62 coming into engagement with the stop 63.

When the piston 56 and attached stem 57 are thus brought to a stop by the lower end of the rod 62 engaging the stop 63, the piston 67 and attached stem 71 will act to maintain the operating lever 52 and thereby the brake cylinder pressure control valve portion 21 of the variable load valve mechanism in its empty position.

Clockwise rotation of the shaft 51 due to rotation of the lever 52 causes the cam 50 carried by the shaft to rotate in the same direction. As the cam is thus rotated, the cam surface engages and forces the plunger 44 and pivot pin 43 inwardly, i. e., in a direction toward the left hand as viewed in Fig. 2 of the drawing. Since the spring 36 acting on one side of piston 35, offers greater resistance to inward movement of the lever 42 than does the spring 30 acting on the valve 29, the piston 35 is maintained stationary, so that a pin 82 for the roller 46 located at one side of the pin 43, becomes the fulcrum for lever 42. Thus, as the plunger 44 and pin 43 are moved inwardly by action of the cam 50, the lever 42 is caused to rock about the pin 82 and through the medium of the rod 48, attached to the opposite end of the lever 42, causes the supply valve 29 to be unseated against the opposing pressure of the spring 30.

Now when the pressure of fluid in valve chamber 15 of the change-over control valve device 6 has been increased to around 35 pounds, the diaphragm 12 will be caused to deflect in a direction toward the right hand against the opposing pressure of spring 19. The diaphragm, as it thus deflects, acts through the medium of the stem 18 to shift the slide valve 17 in the same direction. When the deflection of the diaphragm 12 is brought to a stop by means of an extension 83, carried by the stem 17, engaging an interior surface of the casing, the slide valve 18 will have been moved into a position in which a cavity 84 therein connects the pipe 59 to an atmospheric passage 85. With this communication established fluid under pressure in chambers 58 and 68 of the weighing portion 22 of the variable load valve mechanism 7 is quickly vented to the atmosphere, by way of passage and pipe 59, cavity 84 in the slide valve 18 of the change-over control valve device 6 and atmospheric passage 85.

Upon a reduction in pressure in chambers 58 and 68, springs 61 and 70 acting on the pistons 56 and 67, respectively, will cause each piston and attached stem to move to the position in which they are shown in the drawing. It will be understood that friction between the shaft 51 and its bearing surfaces will be sufficient to maintain the operating lever 52 in its adjusted position when the respective piston stems 57 and 71 are moved out of engagement therewith. It will also be understood that since, the piston stems 57 and 71 are moved out of engagement with the operating lever 52 when the adjustment is made, relative motion between the truck bolster 20 and the side frame 65 will not affect the position of the lever and thereby the adjustment of the brake cylinder pressure control valve portion 21 of the variable load valve mechanism 7 when the vehicle is in motion and that the mechanism will remain in its empty vehicle position until the fluid under pressure in chamber 15 of the change-over control valve device is again reduced below the value of spring 19.

APPLICATION OF THE BRAKES ON AN EMPTY VEHICLE

When it is desired to effect an application of the brakes, the brake pipe pressure is reduced in the usual manner, causing the brake controlling valve device 2 to function to supply fluid under pressure from the auxiliary reservoir 3 to the brake cylinder 5 in order to advance the usual brake shoes (not shown) into frictional engagement with the vehicle wheels. The flow of fluid under pressure from the auxiliary reservoir to the brake cylinder is by way of a pipe 76, through the brake controlling valve device 2 and connected brake cylinder pipe 34.

When the pressure of fluid thus supplied to the brake cylinder 5 has increased to a predetermined degree, sufficient to insure that the brake shoes have been moved into frictional engagement with the vehicle wheels, such, for instance, 5 to 7 pounds, the spring weighted check valve device 9 will unseat and permit flow of fluid from the brake cylinder pipe 34 to the chamber 28 in the brake cylinder pressure control portion 21 of the variable load valve mechanism 7. The flow of fluid from the brake cylinder pipe is by way of pipe 33, pipe 32 through the open check valve device 9 and passage 31.

Fluid under pressure thus supplied to chamber 28 flows past unseated valve 29 to chamber 24 from whence it flows by way of passage and pipe 25 to the volume reservoir 8, which in effect, acts as a dummy brake cylinder.

It should here be mentioned that so long as the brake cylinder pressure control portion 21 of the variable load valve mechanism 7 is conditioned for empty vehicle braking the valve 29 thereof will be maintained unseated.

Now as the pressure of fluid supplied to the brake cylinder and connected pipe 32 is increased, the pressure of fluid in chamber 24 of the brake cylinder pressure control portion 21 of the variable load valve mechanism 7 and connected volume reservoir 8 is increased to effect an application of the brakes to the degree desired. When a full service application of the brakes is effected the pressures of the auxiliary reservoir 3 and the brake cylinder 5 will equalize and the pressure of the reservoir 8 will be lower than this pressure by an amount equal to the value of the spring which weights the check valve of the device 9. Since fluid under pressure is supplied through pipe 34 to both the brake cylinder and the reservoir 8 the equalized pressures of the auxiliary reservoir and brake cylinder will be considerably lower than if the auxiliary reservoir pressure equalized into the brake cylinder alone, thus the desired maximum brake cylinder pressure for an empty vehicle is attained.

RELEASE OF THE BRAKES WITH THE EQUIPMENT CONDITIONED FOR EMPTY CAR OPERATION

When it is desired to effect the release of the brakes the brake pipe pressure is increased in the usual manner, causing the brake controlling valve device 2 to function to establish communication from the brake cylinder pipe 34 to a pipe 88 which leads to the atmosphere. Fluid under pressure now flows from the brake cylinder 5 to the atmosphere by way of pipe 34 through the brake controlling valve device 2 and pipe 88. Fluid under pressure in the volume reservoir 8 also flows to the atmosphere by way of pipe 33, past the check valve 10 interposed in said pipe to connected pipe 34 and then through the circuit just traced. Upon the release of fluid under pressure from the brake cylinder 5, the brake cylinder is caused to operate in the usual manner to effect a release of the vehicle brakes.

AUTOMATIC CHANGE-OVER OPERATION OF THE EQUIPMENT ON A PARTIALLY LOADED VEHICLE

Assuming now that the brakes on the vehicle are released and that the vehicle is separated from a train and that while the brake pipe is deplete of fluid under pressure, lading is placed on the body of the vehicle. Under the influence of such additional weight the vehicle body and consequently the truck bolster 20 will move downwardly relative to the vehicle side frame 65, the bolster supporting springs 88 yielding to the additional weight. Since, as hereinbefore mentioned, the variable load valve mechanism 7 is carried by the bolster and the stop 63 is carried by the truck side frame 65, it will be obvious that the clearance or distance between the lower end of the rod 62, carried by the mechanism 7, and the stop 63 is dependent upon the distance the truck bolster moves vertically relative to the truck side frame.

Now when the vehicle is connected in a train the brake pipe starts to charge with fluid under pressure in the same manner as hereinbefore described in connection with the charging of an empty vehicle. As before described fluid under pressure supplied to the brake pipe flows to chamber 15 in the change-over valve device 6, from whence it flows by way of pipe 59 to chambers 58 and 68 in the weighing portion 22 of the variable load valve mechanism 7. Fluid under pressure thus supplied to chamber 58 causes the piston 56, stem 57 and attached rod 62 to move downwardly in opposition to spring 61 until brought to a stop by the end of the rod 62 coming into engagement with the stop 63. Since it has been assumed that the vehicle was empty, prior to the additional weight being imposed thereon, the operating lever 52 will now be in the position to which it was previously moved with relation to valve casing, it being understood that, due to the downward movement of the truck bolster, it will be in a lower plane. The operating lever in this position will be in operative engagement with the outer end of the stem 71. Fluid under pressure supplied to chamber 68 causes the piston 67 and attached stem 71 to move upwardly in opposition to the pressure of spring 72.

With the outer end of stem 71 engaging the operating lever 52 it is obvious that such upward movement of the piston 67 and attached stem 71 will cause the operating lever 52 and operatively connected shaft 51 to rock in a counter-clockwise direction until brought to a stop by the operating lever 51 coming into engagement with the outer end of the piston stem 57 which is positioned according to the weight of the lading carried by the vehicle. Since the area of piston 57 is larger than the area of piston 67 and since both pistons are subject to the same fluid pressure it will be apparent that the operating lever 52 will be maintained in this position.

When the brake pipe pressure is increased to the degree required to effect operation of the change-over control valve device, this device will operate as before described to vent fluid under pressure from the chambers 58 and 68 of the weighing portion 22, thus permitting the springs 61 and 72 to return the pistons 56 and 67, respectively, to the positions in which they are shown in the drawing, the operating lever 52 remaining in the adjusted position.

It should here be noted that as the operating lever 52 and the operatively connected shaft 51 are rotated in a counter-clockwise direction, from empty position through the partially loaded zone in a direction toward full load position, the cam surface of the cam 50 tends to gradually recede from the end of the plunger 44. As this occurs the spring 36 acts to move the piston 35 outwardly, i. e., in a direction toward the right hand, the piston, as it is being moved, rocking the lever 42 in a counterclockwise direction about a pin 89 which is maintained stationary by the resistance offered by the spring 30 through the medium of the valve 29 and the rod 48 and as a result the plunger 44 and lever 42 move in a direction toward the right hand, the plunger remaining in contact with the cam 50 but following the receding surface thereof. From this it will be understood that the brake cylinder pressure control portion is constructed and arranged to operate automatically to control the communication between the brake cylinder and the reservoir 8 in such a manner as to provide for a higher brake cylinder pressure as the load on the vehicle is increased.

Now with the operating lever 52 and thereby the brake cylinder pressure control portion 21 of the variable load valve mechanism positioned in a braking zone, between full load and empty, in accordance with the load added to the vehicle, the brake equipment is conditioned for braking.

APPLICATION OF THE BRAKES ON A PARTIALLY LOADED VEHICLE

When an application of the brakes is initiated on a partially loaded vehicle by effecting a reduction in brake pipe pressure, the operation of the brake controlling valve device 2 will be identical with the operation already described for an empty vehicle. From this it will be understood that fluid under pressure will be supplied to the brake cylinder until increased to a degree sufficient to unseat the spring weighted check valve 9, whereupon fluid under pressure supplied to the brake cylinder pipe 34 and thereby the brake cylinder will also flow to chamber 24 in the brake cylinder pressure control portion 21 and connected volume reservoir 8.

Now when the pressure of fluid in pressure chamber 24 acting on one side of the piston 35 is slightly greater than the opposing pressure of the spring 36 acting on the other side of the piston, the piston will move inwardly which, in the present embodiment of the invention, is in a direction toward the left hand.

As the piston is thus being moved, the action of the spring 30 causes the supply valve 29 to move toward its seat. Through the medium of the rod 48, the action of the valve 29 causes the lever 42 to rock about the pivot pin 43, in a clockwise direction. Now when the supply valve 29 seats, further flow of fluid under pressure from the brake cylinder to the volume reservoir 8 is closed off and the inward movement of the piston 35 is stopped by the action of the spring 36. Since the piston 35 is brought to a stop at substantially the same time as the supply valve 29 seats, the spring 30 will act to maintain the supply valve seated. Thus the brake cylinder pressure control portion 21 is automatically operated in accordance with the load carried by the vehicle to control the period of time the communication between the brake cylinder and the reservoir 8 remains open.

With the flow of fluid under pressure from the brake cylinder 5 to the volume reservoir cut off, any further flow of fluid under pressure from the auxiliary reservoir 3 to the brake cylinder 5 will result in a direct build-up in brake cylinder pressure.

RELEASE OF THE BRAKES WITH THE EQUIPMENT CONDITIONED FOR A PARTIALLY LOADED VEHICLE

When a release of the brakes is effected on a partially loaded vehicle, the operation of the brake controlling valve device 2 to release fluid under pressure from both the brake cylinder device 5 and the volume 8, to the atmosphere will be identical with the operation already described for an empty vehicle.

As the pressure in the volume reservoir 8 and connected chamber 24 in the brake cylinder pressure control portion 21 reduces, the spring 36 acts to move the piston 35 in a direction toward the left hand and with the cam held stationary in the position to which it has been adjusted and the plunger 44 consequently held against outward movement, the piston causes the lever 42 to rock in a counter-clockwise direction about the pin 43. As the pressure of fluid in chamber 24 continues to reduce, the lever 42 continues to rock and, through the medium of the rod 48, acts to unseat the valve 29 against the opposition of the spring 30 when the pressure in the chamber 24 is reduced to substantially zero. From this it will be understood that the brake cylinder pressure control portion 21 is automatically conditional for the next succeeding application of the brakes.

AUTOMATIC CHANGE-OVER OPERATION OF THE EQUIPMENT ON A FULLY LOADED VEHICLE

Assuming now that the brakes on the vehicle are released and the vehicle separated from a train and that while the brake pipe is deplete of fluid under pressure, the vehicle is fully loaded. From the previous description in connection with a partially loaded vehicle it will be understood that, with the vehicle fully loaded, the distance or clearance between the lower end of rod 62 and the stop 63 will be reduced to its minimum value.

It will also be understood, from the previous description, that when the vehicle is connected in a train the brake pipe starts to charge with fluid under pressure and that such fluid under pressure flows to the chambers 58 and 68 in the weighing portion 22 of the variable load valve mechanism 7. From the description in connection with a partially loaded vehicle it will be understood that the pistons 56 and 68 will be caused to operate, by such fluid, to position the operating lever 52 and thereby the shaft 51 of the brake cylinder control portion 21 in its full load position in which position it is shown in the drawing. It will however be understood that the lower end of the rod 62 will be closer to the lug 63 than shown.

When the brake pipe pressure is increased to the degree required to effect operation of the change-over control valve device 6, this device will operate as before described to vent fluid under pressure from the chambers 58 and 68 and thus permit the springs 61 and 72 to move the pistons 56 and 67 with their attached stems 57 and 71, respectively, to the position shown, thus conditioning the variable load mechanism for full load braking.

As hereinbefore mentioned, with the brake cylinder pressure control portion 21 in full load position, the cam 50 will not exert any inward pressure on the plunger 44 so that the pressure of the spring 30 maintains the valve 29 seated, thus communication between the brake cylinder 5 and the volume reservoir 8 is maintained cut off when the vehicle is fully loaded.

APPLICATION OF THE BRAKES ON A FULLY LOADED VEHICLE

Now when a full service application of the brakes is effected on the fully loaded vehicle, the brake controlling valve device 2 will operate in the usual manner to supply fluid under pressure from the auxiliary reservoir 3 to the brake cylinder 5 until such pressures are equalized.

In effecting an emergency application of the brakes on a fully loaded vehicle the auxiliary reservoir emergency reservoir and brake cylinder pressures will equalize.

When a subsequent release of the brakes is effected the brake controlling valve device 2 will function as hereinbefore described to release fluid under pressure from the brake cylinder and thus effect a release of the brakes in the usual manner.

SUMMARY

When a brake application is effected on an empty vehicle, embodying the invention, the variable load mechanism will be so conditioned as to permit fluid under pressure from the auxiliary reservoir to flow to both the brake cylinder 5 and the volume reservoir 8. When a brake application is effected on a fully loaded vehicle, embodying the invention, the variable load mechanism will be so conditioned that auxiliary reservoir pressure will flow only to the brake cylinder 5, and when the vehicle is partially loaded the increase in pressure in the brake cylinder will be controlled according to the period of time that the communication between the brake cylinder and reservoir 8 remains open which period of time depends upon the weight of the lading carried by the vehicle. The variable load mechanism operates so that the maximum pressure developed in the brake cylinder in a full application of the brakes in empty operation will be substantially less than that on a full application of the brakes during full load operation, and in which a proportional pressure will be developed in the brake cylinder when the vehicle is partially loaded or when less than a full service application is effected.

Having now described my invention, what I claim as new and desire to secure by Letters Patent is:

1. In combination, a brake cylinder device, a volume reservoir, a brake controlling valve device operative to supply fluid under pressure to said brake cylinder device and to said volume reservoir, means adjustable in accordance with the load carried by the vehicle, a brake pipe normally charged with fluid under pressure, means responsive to the pressure of fluid in said brake pipe only when such pressure is less than a chosen degree for effecting operation of said means, and valve means for controlling the flow of fluid under pressure from said brake controlling valve device to said volume reservoir, said valve means being conditioned by said means for operation to limit the pressure of fluid in said volume reservoir inversely according to the degree of load carried by the vehicle to thereby vary the pressure of fluid in the brake cylinder directly according to the load.

2. In combination, a brake cylinder device, a volume reservoir, a brake controlling valve device operative to supply fluid under pressure to said brake cylinder device and to said volume reservoir, means adjustable in accordance with the load carried by the vehicle, fluid pressure responsive means including a movable abutment subject to the pressure of fluid in a chamber and a spring operative for controlling said means, automatic lapping valve means for controlling the flow of fluid under pressure from said brake controlling valve device to said volume reservoir, said valve means being conditioned by said means for operation to limit the pressure of fluid in said volume reservoir inversely according to the degree of load carried by the vehicle to thereby vary the pressure of fluid in the brake cylinder according to the load.

3. In combination, a brake cylinder device, a volume reservoir, a brake controlling valve device, a communication through which fluid under pressure is supplied from said brake controlling valve device to said brake cylinder and said volume reservoir, means adjustable in accordance with the load carried by the vehicle, and self-lapping valve means interposed in said communication between said brake cylinder and said volume reservoir conditioned by said means for operation to one position for maintaining said communication closed to prevent any increase in pressure in said volume reservoir and to another position for maintaining said communication open to permit a maximum increase in pressure in said volume reservoir and adjustable between said positions to vary the increase in pressure in said volume reservoir inversely according to the degree of load carried by the vehicle to thereby vary the pressure of fluid in the brake cylinder directly according to the load.

4. In combination, a brake cylinder, a volume reservoir, a brake controlling valve device operative to supply fluid under pressure to said brake cylinder and to said volume reservoir, valve means having a normal position for closing the communication through which fluid under pressure is supplied from the brake controlling valve device to the volume reservoir and operative to another position upon a predetermined increase in the pressure of fluid supplied thereto for opening the communication, and automatic lapping valve means interposed between said valve means and said volume reservoir for controlling the flow of fluid under pressure from said brake controlling valve device to said volume reservoir with said valve means in said other position, said automatic lapping valve means being conditioned to limit the pressure of fluid in said volume reservoir inversely according to the degree of load carried by the vehicle to thereby vary the pressure of fluid in the brake cylinder directly according to the load.

5. In combination, a brake cylinder, a volume reservoir, a brake controlling valve device operative to supply fluid under pressure to said brake cylinder and to said volume reservoir, a spring weighted check valve for normally closing the communication through which fluid under pressure is supplied from the brake controlling valve device to the volume reservoir and operative upon a predetermined increase in pressure of fluid under pressure supplied thereto to open the communication, valve means interposed between said check valve and volume reservoir for controlling the flow of fluid under pressure from said brake controlling valve device to said volume reservoir with said check valve in its communication open position, said valve means being conditioned for operation to limit the pressure of fluid in said volume reservoir inversely according to the degree of load carried by the vehicle to thereby vary the pressure of fluid in the brake cylinder directly according to the load.

6. In combination, a brake cylinder device, a volume reservoir, a brake controlling valve device, a communication through which fluid under pressure is supplied from said brake controlling valve device to said brake cylinder and said volume reservoir, valve means interposed in the communication between said brake controlling valve device and said volume reservoir for normally closing the communication to the volume reservoir and operative to open said communication upon a predetermined increase in the pressure of fluid supplied thereto, means adjustable in accordance with the load carried by the vehicle, and self-lapping valve means interposed in said communication between said volume reservoir and said valve means for controlling the flow of fluid under pressure from the brake controlling valve device to the volume reservoir with said valve means in its communication open position, said self-lapping valve means being conditioned by said means for operation to limit the pressure of fluid in said volume reservoir inversely according to the degree of the load carried by the vehicle to thereby vary the pressure of fluid in the brake cylinder directly according to the load.

7. In a variable load brake apparatus for a vehicle truck having a relatively stationary part and also having a part movable vertically relative to the stationary part as the load on the vehicle is increased, in combination, a brake cylinder, a volume reservoir, control means for supplying fluid under pressure to said brake cylinder and said volume reservoir, means adjustable in accordance with relative vertical movement between the movable and stationary parts of the vehicle, a fluid pressure operated mechanism carried by the movable part and comprising a strut movable into engagement with the stationary part for adjusting said means, and valve means for controlling the flow of fluid under pressure from said brake controlling valve device to said volume reservoir, said valve means being conditioned by said means for operation to limit the pressure of fluid in said volume reservoir inversely according to the degree of relative movement between the movable and stationary parts of the vehicle to thereby vary the pressure of fluid in the brake cylinder directly according to the increase in load.

8. In a variable load brake apparatus for a vehicle truck having a relatively stationary part and also having a part movable vertically relative to the stationary part as the load on the vehicle is increased, in combination, a brake cylinder, a volume reservoir, control means for supplying fluid under pressure to said brake cylinder and said volume reservoir, means adjustable in accordance with relative vertical movement between the movable and stationary parts of the vehicle, a fluid pressure operated mechanism carried by the movable part and comprising a strut movable into engagement with the stationary part for adjusting said means, valve means conditionable for operation to limit the supply of fluid under pressure to said volume reservoir to different degrees between zero and a predetermined maximum pressure, and fluid pressure operated mechanism including adjustable means for conditioning said valve means for operation to limit the volume reservoir pressure inversely between zero and the maximum pressure according to the degree of relative vertical movement between the movable and stationary parts of the vehicle to thereby vary the pressure of fluid in the brake cylinder directly according to the increase in load.

9. In a variable load brake apparatus for a vehicle truck having a relatively stationary part and also having a part movable vertically relative to the stationary part as the load on the vehicle is increased, in combination, a brake cylinder, a volume reservoir, control means for supplying fluid under pressure to said brake cylinder and said volume reservoir, means adjustable in accordance with relative vertical movement between the movable and stationary parts of the vehicle, a fluid pressure operated mechanism carried by the movable part and comprising a strut movable into engagement with the stationary part for adjusting said means, valve means conditionable for operation to limit the pressure of fluid in the volume reservoir inversely between zero and a predetermined maximum pressure in accordance with the degree of relative vertical movement between the movable and stationary parts of the vehicle to thereby vary the pressure in the brake cylinder directly according to the increase in load, an adjustable member for conditioning said valve means, and fluid pressure responsive means for positioning said adjustable means.

10. In a variable load brake apparatus for a vehicle truck having a relatively stationary part and also having a part movable vertically relative to the stationary part as the load on the vehicle is increased, in combination, a brake cylinder, a volume reservoir, control means for supplying fluid under pressure to said brake cylinder and said volume reservoir, means adjustable in accordance with relative vertical movement between the movable and stationary parts of the vehicle, a fluid pressure operated mechanism carried by the movable part and comprising a strut movable into engagement with the stationary part for adjusting said means, valve means conditionable for operation to vary the attainable limit of volume reservoir pressure inversely according to the degree of relative vertical movement between the movable and stationary parts of the vehicle to thereby vary the pressure in the brake cylinder directly according to the increase in load, fluid pressure operated adjustable means for conditioning said valve means, and means including a movable abutment responsive to the pressure of fluid in a chamber and a spring operative upon a predetermined reduction in pressure in said chamber for supplying fluid under pressure to said fluid pressure operated adjustable means.

GLENN T. McCLURE.